(12) United States Patent
Berger et al.

(10) Patent No.: US 10,703,929 B2
(45) Date of Patent: Jul. 7, 2020

(54) AQUEOUS POLYMER COMPOSITIONS COMPRISING POLYURETHANE (METH)ACRYLATES

(71) Applicant: BASF SE, Ludwigshafen am Rhein (DE)

(72) Inventors: Sebastian Berger, Ludwigshafen (DE); Peter Thuery, Ludwigshafen (DE); Susanne Neumann, Speyer (DE); Uwe Burkhardt, Ludwigshafen (DE); Axel Becker, Altrip (DE); Daniel Kunz, Heidelberg (DE); Stefan Wahl, Ludwigshafen (DE); Christine Roesch, Mainz (DE)

(73) Assignee: BASF SE, Ludwigshafen am Rhein (DE)

( * ) Notice: Subject to any disclaimer, the term of this patent is extended or adjusted under 35 U.S.C. 154(b) by 64 days.

(21) Appl. No.: 15/753,285

(22) PCT Filed: Aug. 16, 2016

(86) PCT No.: PCT/EP2016/069404
§ 371 (c)(1),
(2) Date: Feb. 17, 2018

(87) PCT Pub. No.: WO2017/029280
PCT Pub. Date: Feb. 23, 2017

(65) Prior Publication Data
US 2018/0244948 A1 Aug. 30, 2018

(30) Foreign Application Priority Data
Aug. 17, 2015 (EP) .................................. 15181256

(51) Int. Cl.
| | | |
|---|---|---|
| C09D 151/08 | (2006.01) | |
| C08G 18/73 | (2006.01) | |
| C08G 18/75 | (2006.01) | |
| C08F 290/06 | (2006.01) | |
| C08G 18/22 | (2006.01) | |
| C08G 18/42 | (2006.01) | |
| C08G 18/72 | (2006.01) | |
| C08G 18/08 | (2006.01) | |
| C08G 18/62 | (2006.01) | |
| C08G 18/79 | (2006.01) | |
| C08G 18/32 | (2006.01) | |
| C08G 18/28 | (2006.01) | |
| C08G 18/34 | (2006.01) | |
| C08G 18/40 | (2006.01) | |

(Continued)

(52) U.S. Cl.
CPC ........ *C09D 151/08* (2013.01); *C08F 290/067* (2013.01); *C08G 18/0823* (2013.01); *C08G 18/222* (2013.01); *C08G 18/283* (2013.01); *C08G 18/3206* (2013.01); *C08G 18/3212* (2013.01); *C08G 18/343* (2013.01); *C08G 18/345* (2013.01); *C08G 18/346* (2013.01); *C08G 18/4018* (2013.01); *C08G 18/4238* (2013.01); *C08G 18/4833* (2013.01); *C08G 18/6229* (2013.01); *C08G 18/6674* (2013.01); *C08G 18/6692* (2013.01); *C08G 18/722* (2013.01); *C08G 18/725* (2013.01); *C08G 18/73* (2013.01); *C08G 18/755* (2013.01); *C08G 18/758* (2013.01); *C08G 18/792* (2013.01); *C08L 51/08* (2013.01); *C08L 2201/54* (2013.01)

(58) Field of Classification Search
CPC ...................................................... C09D 151/08
See application file for complete search history.

(56) References Cited

U.S. PATENT DOCUMENTS

| | | | |
|---|---|---|---|
| 4,298,738 A | 11/1981 | Lechtken et al. | |
| 5,596,065 A | 1/1997 | Gerlitz et al. | |

(Continued)

FOREIGN PATENT DOCUMENTS

| | | | |
|---|---|---|---|
| DE | 19618720 A1 | 11/1996 | |
| DE | 19525489 A1 | 1/1997 | |

(Continued)

OTHER PUBLICATIONS

International Search Report and Written Opinion for International Application No. PCT/EP2016/069404, dated Oct. 5, 2016, 7 pages.

(Continued)

*Primary Examiner* — Michael F Pepitone
(74) *Attorney, Agent, or Firm* — Armstrong Teasdale LLP

(57) ABSTRACT

Aqueous polymer compositions and their use as coatings are disclosed. A composition includes at least one polyurethane (meth)acrylate A and at least one compound B having a molecular weight of below 1000 g/mol and having at least two ethylenically unsaturated double bonds per molecule. The polyurethane (meth)acrylates A include the following components: component A1 includes at least one polyisocyanate A1a and at least one diisocyanate A1b; component A2 includes at least one compound having at least one ethylenically unsaturated double bond, and at least one functional group F; component A3 includes at least one neutral polyol including at least one aliphatic, polymeric polyol A3a and at least one low molecular weight diol A3b; component A4 includes at least one compound having at least one ionic or ionizable group I' and at least one functional group F'; and component A5 includes at least one poly-$C_2$-$C_3$ alkylene ether.

25 Claims, No Drawings

(51) Int. Cl.
*C08G 18/48* (2006.01)
*C08G 18/66* (2006.01)
*C08L 51/08* (2006.01)

(56) References Cited

U.S. PATENT DOCUMENTS

| | | | |
|---|---|---|---|
| 5,684,081 | A | 11/1997 | Dannhorn et al. |
| 6,207,744 | B1 | 3/2001 | Paulus et al. |
| 6,521,702 | B1 | 2/2003 | Weikard et al. |
| 6,538,046 | B1 | 3/2003 | Paulus et al. |
| 9,752,056 | B2 * | 9/2017 | Berger ............... C08G 18/6659 |
| 2005/0238815 | A1 | 10/2005 | Dvorchak et al. |
| 2015/0225606 | A1 | 8/2015 | Berger et al. |

FOREIGN PATENT DOCUMENTS

| | | |
|---|---|---|
| DE | 19810793 A1 | 9/1999 |
| DE | 19826712 A1 | 12/1999 |
| DE | 19913353 A1 | 9/2000 |
| DE | 19933012 A1 | 1/2001 |
| DE | 19957604 A1 | 5/2001 |
| DE | 19957900 A1 | 6/2001 |
| EP | 0007508 A2 | 2/1980 |
| EP | 0057474 A2 | 8/1982 |
| EP | 0495751 A1 | 7/1992 |
| EP | 0615980 A2 | 9/1994 |
| EP | 0694531 A2 | 1/1996 |
| EP | 1591502 A1 | 11/2005 |
| EP | 2316867 A1 | 5/2011 |
| WO | 9833761 A1 | 8/1998 |
| WO | 0234808 A1 | 5/2002 |
| WO | 03022552 A1 | 3/2003 |
| WO | 03035596 A2 | 5/2003 |
| WO | 2004029121 A1 | 4/2004 |
| WO | 2010063612 A1 | 6/2010 |
| WO | 2014063920 A1 | 5/2014 |
| WO | WO-2014063920 A1 * | 5/2014 ......... C08G 18/6659 |

OTHER PUBLICATIONS

P. Glöckner et al. "Radiation Curing for Coatings and Printing Inks" Vincentz Network 2008, pp. 77-80.
Blank et al. in Progress in Organic Coatings, 1999, vol. 35, pp. 19-29.

* cited by examiner

AQUEOUS POLYMER COMPOSITIONS COMPRISING POLYURETHANE (METH)ACRYLATES

CROSS-REFERENCE TO RELATED APPLICATIONS

This application is a U.S. National Phase Application of PCT/EP2016/069404, filed Aug. 16, 2016, which claims the benefit of priority to EP Application No. 15181256.7, filed Aug. 17, 2015, the contents of which are hereby expressly incorporated by reference in their entirety.

The present invention relates to aqueous polymer compositions comprising in dispersed form at least one polyurethane (meth)acrylate A and at least one compound B having a molecular weight of below 1000 g/mol and having on average more than two ethylenically unsaturated double bonds per molecule. The invention also relates to the use of the aqueous polymer compositions for producing coatings. The invention further relates to the polyurethane (meth) acrylates A.

BACKGROUND OF THE INVENTION

Aqueous dispersions of polyurethanes with acrylate/methacrylate group modification, known as polyurethane (meth)acrylates, and their use in radiation-curable coating compositions have been known for some time (see, for example, P. Glockner et al. "Radiation Curing for Coatings and Printing Inks" Vincentz Network 2008, pp. 77-80). This relates to polyurethanes based on diisocyanates and polyols that are modified with acrylic or methacrylic groups and that in general, in order to improve their dispersibility, have repeating units with ionic groups and/or polyethylene oxide groups. In order to increase the double bond density and to improve the mechanical properties of the coating, the polyurethane (meth)acrylates are frequently formulated with reactive diluents.

Radiation-curable, water-emulsifiable polyurethane (meth)acrylates are known from, for example, EP 694531 A2, DE 19525489 A1, DE 19810793 A1, DE 19933012 A1, DE 19957604 A1, or EP 1591502 A1.

WO 03/022552 describes aqueous dispersions of radiation-curable polyurethanes which are obtainable by reaction of an isocyanate-terminated polyurethane prepolymer with a hydroxylated acylate. The aqueous dispersions are suitable for producing embossed, coated substrates.

WO 02/034808 relates to photoactivatable coating compositions on a water basis, comprising a) a (meth)acryloyl-functional polyurethane in the form of an aqueous dispersion, containing 5 to 18 wt % of alkaline oxide groups and having a (meth)acryloyl functionality in the range from 2 to 40, and b) a UV initiator.

WO 2014/063920 relates to water-soluble or water-dispersible, radiation-curable urethane(meth)acrylates (A) which are constructed substantially from (a) at least one (cyclo)aliphatic di- and/or polyisocyanate, (b1) at least one (cyclo)aliphatic diol, having a molar mass of less than 700 g/mol, (b2) at least one polyester diol having a weight-average molar mass Mw of 700 to 2000, (c) at least one compound having at least one isocyanate-reactive group and at least one radically polymerizable unsaturated group, (d) at least one compound which has at least one isocyanate-reactive group and at least one acid group, (e) at least one base for at least partial neutralization with the acid groups of component (d), (h1) at least one amine which is substituted by one or two hydrocarbon radicals and in which the hydrocarbon radicals together have at least 12 carbon atoms.

SUMMARY OF THE INVENTION

The object on which the present invention is based is that of providing aqueous polymer compositions which are radiation-curable and are suitable for producing coatings, especially for pigment-containing coatings, having advantageous properties. The coatings in the cured state are to exhibit high surface hardness, high chemical resistance, particularly in the case of pigment-containing coatings, but also in the case of transparent coating materials, and are to exhibit low dirt pickup and good mechanical stability. Other desirable features are a high level of fullness and a low tendency on the part of the coating to undergo yellowing. Moreover, the compositions of the invention are to ensure uniform film-forming and are preferably to yield coatings which even in the dried, as yet uncrosslinked state have a hard surface which is not tacky or which has minimal tack, in order to improve handling qualities and in order to reduce defects in the coating that result from the processing operation. These properties are to be achieved in particular without the use of toxicologically objectionable starting materials such as bisphenol A derivatives which are normally used in order to achieve good coating qualities. The polymer compositions, furthermore, ought to be optically transparent, be highly stable in storage, and not undergo separation.

These and further objects are achieved by the aqueous polymer compositions described hereinafter.

The invention provides aqueous polymer compositions comprising in dispersed form A at least one polyurethane (meth)acrylate constructed from the following structural components:
  A1 an isocyanate component A1 comprising:
    A1a at least one polyisocyanate obtainable by oligomerization of at least one diisocyanate and having an average isocyanate functionality of at least 2.5, the diisocyanate having at least one saturated alicyclic structural unit; and
    A1b at least one diisocyanate selected from saturated aliphatic and saturated alicyclic diisocyanates;
  A2 at least one compound A2 which has at least one ethylenically unsaturated double bond in the form of an acrylic or methacrylic group, and also has at least one functional group F which reacts with an isocyanate group to form a covalent bond;
  A3 at least one neutral polyol component A3 comprising
    A3a at least one aliphatic, polymeric polyol A3a having an average OH functionality in the range from 1.5 to 2.5;
    A3b at least one low molecular weight diol compound A3b having a molecular weight of not more than 400 g/mol and selected from saturated aliphatic and saturated alicyclic diols;
  A4 at least one compound A4 which has at least one ionic or ionizable group I' and at least one functional group F' which reacts with an isocyanate group to form a covalent bond;
  and optionally
  A5 at least one poly-$C_2$-$C_3$ alkylene ether compound A5 having an average OH functionality in the range from 0.9 to 1.2;
and
B at least one compound B having a molecular weight below 1000 g/mol and having on average more than two ethylenically unsaturated double bonds per molecule, the ethylenically unsaturated double bond being present in the form of acrylic or methacrylic groups.

Further provided by the invention is a polyurethane (meth)acrylate constructed from the structural components A1, A2, A3, A4, and optionally A5, which are defined herein.

Additionally provided for the invention is a method for producing the aqueous polymer compositions of the invention.

Further provided by the invention are aqueous coating compositions, more particularly pigment-containing aqueous coating compositions, comprising at least one aqueous polymer composition of the invention and at least one photoinitiator.

The invention further provides for the use of the aqueous polymer compositions of the invention or of the coating compositions of the invention to coat surfaces.

Additionally provided by the invention is a method for coating surfaces that comprises applying an aqueous composition of the invention or a coating composition of the invention to the wood surface to be coated, to give a wet coating, drying the wet coating, and curing the coating using high-energy radiation.

The aqueous polymer compositions of the invention result in coatings having good properties in terms of mechanical stability, fullness, chemical resistance, yellowing tendency, dirt pickup propensity, and spotting in the cured state. The aforementioned advantageous properties, especially the high level of resistance toward chemicals, are achieved in particular also for pigment-containing coating compositions, but also in the case of transparent coating materials. The coatings obtained using the compositions of the invention are notable, moreover, for high hardness and low tack in the dry, as yet uncured state. The aforesaid advantageous properties, particularly the high chemical resistance and high mechanical stability, and also the property of exhibiting low tack and high hardness even in the uncured state, can be achieved without the use of toxicologically objectionable starting materials such as bisphenol A derivatives which are frequently used in order to attain these properties. In view of the materials employed it is possible to design the aqueous polymer compositions in such a way that they dry rapidly. On the basis of the materials employed, moreover, it is possible to prepare the aqueous polymer compositions of the invention without using dialkyltin compounds and to render them phenol-free. The aqueous polymer compositions of the invention, moreover, are stable in storage, optically transparent, and have little or no tendency to undergo separation, a problem which occurs especially when compounds B with low water-solubility are used.

DETAILED DESCRIPTION OF THE INVENTION

In the context of the invention the term "saturated aliphatic diisocyanates" refers to saturated acyclic and cyclic hydrocarbon compounds which carry two isocyanate groups. This term refers more particularly to acyclic saturated aliphatic diisocyanates.

In the context of the invention the term "saturated alicyclic diisocyanates" refers to saturated hydrocarbon compounds having at least one, e.g., 1 or 2, carbocyclic structural units, having for example 1 or 2 cyclohexane units, which have two isocyanate groups.

In the context of the invention the term "saturated aliphatic diols" refers to saturated hydrocarbon compounds which carry two alcohol groups. Preference is given to acyclic saturated aliphatic diols.

In the context of the invention the term "saturated alicyclic diols" refers to saturated hydrocarbon compounds having at least one, e.g., 1 or 2, carbocyclic structural units, having for example 1 or 2 cyclohexane units, which bear two alcohol groups.

Unless otherwise specified, standards and data on (measurement) methods relate to the corresponding ISO and IUPAC publications on the date of patent filing.

The aqueous polymer composition of the invention comprises at least one polyurethane (meth)acrylate A in dispersed form. The polyurethane (meth)acrylate A is constructed from components A1, A2, A3, A4, and optionally A5. Aside from the constituents A1, A2, A3, A4, and optionally A5, the polyurethane (meth)acrylate comprises essentially no further constituents different from the aforesaid structural components A1, A2, A3, A4, and optionally A5; in other words, the fraction of compounds different from the aforesaid structural components A1, A2, A3, A4, and optionally A5 will typically not exceed 5 wt %, more particularly 1 wt %, based on the total weight of the structural components A1, A2, A3, A4, and optionally A5.

The isocyanate component A1 comprises in accordance with the invention:

A1a at least one polyisocyanate A1a obtainable by oligomerization of at least one diisocyanate and having an average isocyanate functionality of at least 2.5, as for example a functionality in the range from 2.5 to 4, the diisocyanate having at least one saturated alicyclic structural unit; and A1b at least one diisocyanate A1b selected from saturated aliphatic and saturated acyclic diisocyanates.

Component A1a comprises oligomers obtainable by oligomerization of diisocyanates which have at least one, more particularly precisely one, cycloaliphatic structural unit, e.g., 1 or 2 cyclohexane rings, and which preferably possess 4 to 20 C atoms. Diisocyanates of this kind are also referred to below as cycloaliphatic diisocyanates. Examples of cycloaliphatic diisocyanates are 1,4-, 1,3- or 1,2-diisocyanatocyclohexane, 4,4'- or 2,4'-di(isocyanatocyclohexyl)methane, 1-isocyanato-3,3,5-trimethyl-5-(isocyanatomethyl)cyclohexane (isophorone diisocyanate), 1,3- or 1,4-bis(isocyanatomethyl)cyclohexane or 2,4-, or 2,6-diisocyanato-1-methylcyclohexane, and also 3 (or 4), 8 (or 9)-bis(isocyanatomethyl)-tricyclo[5.2.1.0$^{2,6}$]decane isomer mixtures.

Suitable oligomers A1a are i. isocyanurates of the aforementioned cycloaliphatic diisocyanates,
ii. polyisocyanates having uretdione groups and based on the aforementioned cycloaliphatic diisocyanates,
iii. polyisocyanates having biuret groups and based on the aforementioned cycloaliphatic diisocyanates,
iv. polyisocyanates having urethane and/or allophanate groups and based on the aforementioned cycloaliphatic diisocyanates,
v. polyisocyanates having oxadiazine trione groups and based on the aforementioned cycloaliphatic diisocyanates,
vi. polyisocyanates having iminooxadiazine trione groups and based on the aforementioned cycloaliphatic diisocyanates.

Preferred polyisocyanate compounds A1a are selected from isocyanurates of a cycloaliphatic diisocyanate, examples being isocyanurates of isophorone diisocyanate, of 1,4-, 1,3-, or 1,2-diisocyanatocyclohexane, of 1,3-1,4-bis(isocyanatomethyl)-cyclohexane, of 1,4-bis(isocyanatomethyl)cyclohexane, of 2,4-diisocyanato-1-methylcyclohexane, or of 2,6-diisocyanato-1-methylcyclohexane.

Oligomers A1a of this kind typically have a number-average molecular weight in the range from 400 to 1800 daltons, more particularly in the range from 500 to 1600 daltons. The degree of oligomerization is typically in the range from 2.5 to 8, more particularly in the range from 3 to 6.

The average isocyanate functionality of the oligomers A1a is preferably in the range from 2.5 to 6, and more particularly in the range from 2.8 to 4.5, and especially in the range from 2.8 to 4.0. An average isocyanate functionality is understood to be the average number of isocyanate groups in the oligomer (number average).

Preferred oligomers A1a are those having an isocyanate equivalent weight in the range from 180 to 500 g/mol NCO, more particularly in the range from 200 to 400 g/mol NCO.

The amount of diisocyanate is preferably below 10 wt %, based on the oligomer A1a.

With particular preference the polyisocyanate compounds A1a are selected from isocyanurates of isophorone diisocyanate, more particularly those having an average isocyanate functionality in the range from 2.5 to 6, more particularly in the range from 2.8 to 4.5, and especially in the range from 2.8 to 4.0, and having an isocyanate equivalent weight of preferably in the range from 200 to 400 g/mol NCO.

The isophorone diisocyanate used for the oligomerization is frequently a mixture, specifically a mixture of the cis and trans isomers, generally in a mass ratio of 60:40 to 80:20, more particularly in a ratio of 70:30 to 75:25, and particularly especially in a ratio of about 75:25.

The diisocyanates A1b are preferably saturated aliphatic and saturated alicyclic diisocyanates having 4 to 20 C atoms. Examples of such diisocyanates having 4 to 20 C atoms are aliphatic diisocyanates such as tetramethylene diisocyanate, 1,5-pentamethylene diisocyanate, hexamethylene diisocyanate (1,6-diisocyanatohexane), octamethylene diisocyanate, decamethylene diisocyanate, dodecamethylene diisocyanate, tetradecamethylene diisocyanate, trimethylhexane diisocyanate, or tetramethylhexane diisocyanate, cycloaliphatic diisocyanates such as 1,4-, 1,3-, or 1,2-diisocyanatocyclohexane, 4,4'- or 2,4'-di(isocyanatocyclohexyl) methane, 1-isocyanato-3,3,5-trimethyl-5-(isocyanatomethyl)cyclohexane (isophorone diisocyanate), 1,3- or 1,4-bis(isocyanatomethyl)cyclohexane, or 2,4-, or 2,6-diisocyanato-1-methylcyclohexane, and also 3 (or 4),8 (or 9)-bis(isocyanato-methyl)tricyclo[5.2.1.0$^{2,6}$]decane isomer mixtures.

Particularly preferred are hexamethylene diisocyanate, 1,3-bis(isocyanatomethyl)cyclohexane, isophorone diisocyanate, 4,4'-di(isocyanatocyclohexyl)methane and 2,4'-di(isocyanatocyclohexyl)methane and mixtures thereof, and especially preferred are isophorone diisocyanate, 4,4'-di(isocyanatocyclohexyl)methane, and hexamethylene diisocyanate.

In one specific embodiment the diisocyanate compounds A1b are selected from saturated alicyclic diisocyanates, and more particularly from isophorone diisocyanate and bis(4-isocyanatocyclohexyl)methane and mixtures thereof.

In general the polyisocyanate A1a makes up 40 to 95 wt %, based on the total weight of the isocyanate component A1. More particularly the polyisocyanate A1a makes up 45 to 90 wt %, more particularly 50 to 85 wt %, and especially 65 to 85 wt %, based on the total weight of the isocyanate component A1. In general, a higher content of polyisocyanate A1a will result in lower tackiness of coating films in uncured state obtained from the polymer compositions. The fraction of component A1b as a proportion of the isocyanate component A1 is generally 5 to 40 wt %, frequently 10 to 30 wt %, and especially 15 to 25 wt %.

The total amount of polyisocyanate A1a and diisocyanate A1b preferably makes up at least 50 wt %, e.g., 50 to 100 wt % or 50 to 95 wt %, based on the total weight of the isocyanate component A1. More particularly the total amount of polyisocyanate A1a and diisocyanate A1b makes up at least 60 wt %, e.g. 60 to 100 wt % or 60 to 92 wt %, especially at least 70 wt %, e.g., 70 to 100 wt % or 70 to 90 wt %, based on the total weight of the isocyanate component A1.

In a further embodiment, the isocyanate component further comprises at least one polyisocyanate A1c having an average isocyanate functionality of at least 2.5, as for example in the range from 2.5 to 6, and especially in the range from 2.8 to 4.0, which is obtainable by oligomerization of a $C_2$-$C_8$ alkylene diisocyanate.

Suitable oligomers A1c are allophanates, isocyanurates, and uretdiones of a $C_2$-$C_8$ alkylene diisocyanate, such as tetramethylene diisocyanate, 1,5-pentamethylene diisocyanate, hexamethylene diisocyanate (1,6-diisocyanatohexane), octamethylene diisocyanate, decamethylene diisocyanate, dodecamethylene diisocyanate, tetradecamethylene diisocyanate, trimethylhexane diisocyanate, or tetramethylhexane diisocyanate.

Oligomers A1c of this kind typically have a number-average molecular weight in the range from 400 to 1600 daltons, more particularly in the range from 450 to 1400 daltons. The degree of oligomerization is typically in the range from 2.5 to 8, more particularly in the range from 3 to 6.

Preferred oligomers A1c are those having an isocyanate equivalent weight in the range from 120 to 400 g/mol NCO, more particularly in the range from 150 to 300 g/mol NCO.

The amount of diisocyanate in the oligomers A1c is preferably below 10 wt %, based on the total amount of the oligomers A1c.

Preferred polyisocyanate compounds A1c are selected from isocyanurates of a $C_4$-$C_8$ alkylene diisocyanate, more particularly from isocyanurates of hexamethylene diisocyanate.

The polyisocyanate A1c is preferably selected from an isocyanurate of hexamethylene diisocyanate that has an average isocyanate functionality in the range from 2.5 to 6, more particularly in the range from 2.8 to 4.5, and especially in the range from 2.8 to 4.0, and that preferably has an isocyanate equivalent weight in the range from 150 to 300 g/mol NCO.

Where present, the polyisocyanate A1c makes up frequently 3 to 50 wt %, based on the total weight of the isocyanate component A1. More particularly the polyisocyanate A1c, where present, makes up 8 to 40 wt %, especially 10 to 30 wt %, based on the total weight of the isocyanate component A1.

In general the isocyanate component A1 comprises substantially no isocyanate components which are different from the aforementioned isocyanates A1a, A1b, and A1c; in other words, the fraction of isocyanate compounds which are different from the aforementioned isocyanates A1a, A1b, and A1c, will typically not exceed 5 wt %, more particularly 1 wt %, based on the total weight of the isocyanate component A1.

Component A2 comprises at least one compound which has at least one, more particularly precisely one, ethylenically unsaturated double bond in the form of an acrylic or methacrylic group and also has at least one, more particularly precisely one, functional group F which reacts with an isocyanate group to form a covalent bond.

The functional group F is preferably selected from —OH, —NH$_2$, and —NRH, where R is a saturated or unsaturated aliphatic hydrocarbon radical having 1 to 10 C atoms. More preferably the functional group F is an —OH group.

Preferred components A2 are selected from hydroxy-C$_2$-C$_8$ alkyl esters of acylic acid, hydroxy-C$_2$-C$_8$ alkyl esters of methacrylic acid, hydroxy-C$_2$-C$_8$ alkylamides of acrylic acid, hydroxy-C$_2$-C$_8$ alkylamides of methacrylic acid, diesters of C$_3$-C$_8$ alkanetriols with acrylic acid, and diesters of C$_3$-C$_8$ alkanetriols with methacrylic acid, with component A2 being selected more particularly from hydroxy-C$_2$-C$_4$ alkyl esters of acrylic acid. The compound A2 is especially 2-hydroxyethyl acrylate.

The polyol component A3 comprises

A3a at least one aliphatic polymeric polyol having an average OH functionality in the range from 1.5 to 3.5, more particularly in the range from 1.8 to 3.0; and A3b at least one low molecular weight diol compound having a molecular weight of not more than 400 g/mol, more particularly of not more than 300 g/mol, which is selected from saturated aliphatic and saturated alicyclic diols.

An average OH functionality refers to the average number of hydroxyl groups possessed by the molecules of the polymeric polyol (number average). The OH number of polymeric polyol component is preferably in the range from 5 to 220, more particularly in the range from 10 to 200 mg KOH/g, determined according to DIN 53240-2:2007-11.

Suitable polymeric polyol components A3a are polyesterols, polyetherols, and polycarbonat polyols. The polymeric polyol component A3a preferably comprises no aromatic groups, in order to achieve low yellowing propensity.

The polymeric polyol component A3a preferably has a number-average molecular weight in the range from 350 to 10 000 g/mol, more particularly in the range from 400 to 8000 g/mol, especially in the range from 450 to 5000 g/mol.

The polymeric polyol component A3a more particularly comprises at least one aliphatic polyester polyol. Preferred polyesterols are those based on aliphatic or cycloaliphatic dicarboxylic acids with aliphatic diols. Preferred polyester polyols have OH numbers, determined according to DIN 53240-2:2007-11, in the range from 5 to 220, more particularly in the range from 10 to 200 mg KOH/g. The acid number is preferably below 20 mg KOH/g, more particularly below 10 mg KOH/g.

Suitable aliphatic diols for preparing the polyester polyols preferably have 2 to 40 C atoms, more particularly 4 to 10 C atoms. Examples of aliphatic diols are ethylene glycol, propane-1,2-diol, propane-1,3-diol, butane-1,2-diol, butane-1,3-diol, butane-1,4-diol, butane-2,3-diol, pentane-1,2-diol, pentane-1,3-diol, pentane-1,4-diol, pentane-1,5-diol, pentane-2,3-diol, pentane-2,4-diol, hexane-1,2-diol, hexane-1,3-diol, hexane-1,4-diol, hexane-1,5-diol, hexane-1,6-diol, hexane-2,5-diol, heptane-1,2-diol 1,7-heptanediol, 1,8-octanediol, 1,2-octanediol, 1,9-nonanediol, 1,2-decanediol, 1,10-decanediol, 1,2-dodecanediol, 1,12-dodecanediol, 1,5-hexadiene-3,4-diol, neopentyl glycol (2,2-di-methylpropane-1,3-diol), 2,2-diethylpropane-1,3-diol, 2-methyl-2-ethylpropane-1,3-diol, 2-methyl-2,4-pentanediol, 2,4-dimethyl-2,4-pentanediol, 2-ethyl-1,3-hexanediol, 2,5-dimethyl-2,5-hexanediol, 2,2,4-trimethyl-1,3-pentanediol, pinacol, diethylene glycol, triethylene glycol, dipropylene glycol, and tripropylene glycol. Also suitable are higher polyethylene glycols HO(CH$_2$CH$_2$O)$_n$—H, higher polypropylene glycols HO(CH[CH$_3$]CH$_2$O)$_n$—H, where n is an integer and n≥4, e.g., 4 to 20, and polyethylene-polypropylene glycols, more particularly those having 4 to 20 repeating units, it being possible for the sequence of the ethylene oxide and propylene oxide units to be blockwise or random, and polytetramethylene glycols, more particularly those having 4 to 20 repeating units, and poly-1,3-propanediols, more particularly those having 4 to 20 repeating units.

Suitable cycloaliphatic diols for preparing the polyester polyols are 1,2-, and 1,3-cyclopentanediols, 1,2-, 1,3-, and 1,4-cyclohexanediol, 1,1-, 1,2-, 1,3- and 1,4-bis-(hydroxymethyl)cyclohexanes, 1,1-, 1,2-, 1,3-, and 1,4-bis(hydroxyethyl)cyclohexanes, bis(4-hydroxycyclohexane)methane, and bis(4-hydroxycyclohexane)isopropylidene. Preferred among these are 1,2-, 1,3-, and 1,4-cyclohexanediol, 1,3-bis(hydroxymethyl)cyclohexane and 1,4-bis(hydroxymethyl)cyclohexane, and bis(4-hydroxycyclohexane)methane.

Preferred diols for preparing the polyester polyols are acyclic aliphatic diols having 2 to 8 C atoms, as for example ethylene glycol, 1,2-propanediol, 1,3-propanediol, 2,2-dimethyl-1,2-ethanediol, 2,2-dimethyl-1,3-propanediol (neopentyl glycol), 2,2-diethylpropane-1,3-diol, 2-methyl-2-ethylpropane-1,3-diol, 1,2-butanediol, 1,3-butanediol, 1,4-butanediol, 1,6-hexanediol, or diethylene glycol. Particularly preferred diols for preparing the polyester polyols are ethylene glycol, 1,2-propanediol, 1,3-propanediol, neopentyl glycol, 1,4-butanediol, and diethylene glycol.

The dicarboxylic acid building blocks used in preparing the polyester polyols may be the free acids or ester-forming derivatives thereof. Derivatives are understood preferably to be the corresponding anhydrides, monoalkyl and dialkyl esters, preferably mono- and di-C$_1$-C$_4$ alkyl esters, more preferably monomethyl and dimethyl esters, and also the corresponding monoethyl and diethyl esters, and additionally monovinyl and divinyl esters, and also mixed esters, examples being mixed esters with different C$_1$-C$_4$ alkyl components, especially mixed methyl ether esters.

C$_1$-C$_4$ Alkyl in the context of this specification denotes methyl, ethyl, isopropyl, n-propyl, n-butyl, isobutyl, sec-butyl, and tert-butyl, preferably methyl, ethyl, and n-butyl, more preferably methyl and ethyl, and very preferably methyl.

Particularly suitable dicarboxylic acids which can be used in preparing the polyester polyols include aliphatic dicarboxylic acids and/or alkanedicarboxylic acids having 2 to 12 C atoms, and cycloaliphatic dicarboxylic acids and/or cycloalkanedicarboxylic acids having 7 to 14 C atoms.

Examples of aliphatic dicarboxylic acids which can be used in preparing the polyester polyols are oxalic acid, malonic acid, maleic acid, fumaric acid, succinic acid, glutaric acid, adipic acid, pimelic acid, suberic acid, azelaic acid, sebacic acid, undecane-α,ω-dicarboxylic acid, dodecane-α,ω-dicarboxylic acid, and derivatives thereof. Examples of cycloaliphatic dicarboxylic acids are cis- and trans-cyclohexane-1,2-dicarboxylic acid (hexahydrophthalic acids), cis- and trans-cyclohexane-1,3-dicarboxylic acid, cis- and trans-cyclohexane-1,4-dicarboxylic acid, 1,2-, 1,3-, or 1,4-cyclohex-4-ene dicarboxylic acid (tetrahydrophthalic acids), cis- and trans-cyclopentane-1,2-dicarboxylic acid, cis- and trans-cyclopentane-1,3-dicarboxylic acid, and derivatives thereof.

Preferred dicarboxylic acids are saturated aliphatic dicarboxylic acids, more particularly those having 3 to 10 C atoms such as succinic acid, glutaric acid, adipic acid, pimelic acid, suberic acid, azelaic acid, sebacic acid, undecane-α,ω-dicarboxylic acid, and dodecane-α,ω-dicarboxylic acid.

Suitable polyesterols are also those based on lactone, more particularly those based on aliphatic lactone having 4 to 8 C atoms, such as butyrolactone, valerolactone, or caprolactone, for example.

Polyester polyols and their preparation are known for example from Ullmann's Enzyklopädie der technischen Chemie, 4th edition, volume 19, pp. 62 to 65.

Component A3a is preferably selected from aliphatic polyesters, more particularly from aliphatic polyester polyols constructed from at least one $C_3$-$C_{12}$ alkanedicarboxylic acid and at least one $C_3$-$C_{10}$ alkanediol.

In one particularly preferred embodiment of the invention, component A3a is a polyester polyol which is constructed from adipic acid and neopentyl glycol and which in particular has an OH number in the range from 20 to 200 mg KOH/g.

With more particular preference the aliphatic polyester of this embodiment has a number-average molecular weight in the range from 450 to 5000 g/mol. With particular preference the aliphatic polyester of this embodiment has a number-average molecular weight in the range from 480 to 2500 g/mol, especially preferably in the range from 500 to 2000 g/mol.

Contemplated as component A3b are, for example, the aliphatic and cycloaliphatic diols stated in connection with the polyester component.

Component A3b preferably comprises at least one diol with at least a saturated alicyclic structure, more particularly with at least one cyclohexane ring. Examples of diols having at least one saturated, alicyclic structure are 1,2- and 1,3-cyclopentanediols, 1,2-, 1,3-, and 1,4-cyclohexanediol, 1,1-, 1,2-, 1,3-, and 1,4-bis(hydroxymethyl)cyclohexanes, 1,1-, 1,2-, 1,3-, and 1,4-bis(hydroxyethyl)cyclohexanes, and bis(4-hydroxycyclohexane)isopropylidene. Preferred among these are 1,2-, 1,3-, and 1,4-cyclohexanediol, 1,3-bis(hydroxymethyl)cyclohexane, 1,4-bis(hydroxymethyl)cyclohexane, bis(4-hydroxycyclohexane)methane, and bis(4-hydroxycyclohexane)isopropylidene. More particularly component A3b is 1,4-bis(hydroxymethyl)cyclohexane.

In general the polyol component A3 comprises substantially no polyol components which are different from the aforesaid components A3a and A3b; in other words, the fraction of polyols which are different from the aforesaid components A3a and A3b will typically, unless forming part of component A2, A4, or A5, not exceed 5 wt %, more particularly 1 wt %, based on the total weight of the polyol component A3.

Component A4 comprises at least one compound which has at least one, e.g., one or two, ionic or ionizable group(s) I' and at least one, e.g., one or two, functional group(s) F' which reacts with an isocyanate group to form a covalent bond.

The functional group F' is preferably selected from —OH, —$NH_2$, and —NR'H, where R' is a saturated or unsaturated hydrocarbon radical having 1 to 10 C atoms. More particularly the functional group F' is an OH group.

The ionic or ionizable group I' is preferably selected from acid groups in the acid or salt form, more particularly from carboxyl groups. Examples of acid groups are —COOH, —$SO_3H$, or —POSH. The acid groups may be present in their anionic forms, in which case they have a counterion. Examples of counterions are alkali metal and alkaline earth metal ions, e.g., $Li^+$, $Na^+$, $K^+$, $Cs^+$, $Mg^{+2}$, $Ca^{2+}$, or $Ba^{2+}$. Additionally present as counterion may be the ammonium ions or quaternary ammonium ions derived from ammonia or amines, more particularly from tertiary amines, such as, for example, ammonium, methylammonium, dimethylammonium, trimethylammonium, ethylammonium, diethylammonium, triethylammonium, tributylammonium, diisopropylethylammonium, benzyldimethylammonium, monoethanolammonium, diethanolammonium, triethanolammonium, hydroxyethyldimethylammonium, hydroxyethyldiethylammonium, monopropanolammonium, dipropanolammonium, tripropanolammonium, piperidinium, piperazinium, N,N'-dimethylpiperazinium, morpholinium, pyridinium, tetramethylammonium, triethylmethylammonium, 2-hydroxyethyltrimethylammonium, bis(2-hydroxyethyl)dimethylammonium, or tris(2-hydroxyethyl)methylammonium.

Examples of compounds of component A3 are those of the formula

and salts thereof, where n is 1, 2, or 3 and more particularly is 2;

F' has the definitions as stated above and more particularly is OH;

I' is an ionic or ionizable group, more particularly an acid group, and especially a carboxyl group;

R is a saturated aliphatic or alicylic hydrocarbon radical which has 2 to 20 C atoms.

Component A4 is selected with particular preference from aliphatic dihydroxycarboxylic acids, more particularly from those having 3 to 10 C atoms and their salts. Examples of such aliphatic dihydroxycarboxylic acids are 2,3-dihydroxypropanic acid, 2,2-dimethylolpropionoic acid, 2,2-dimethylolbutyric acid, and 2,2-dimethylolpentanoic acid, with preference being given to 2,2-dimethylolpropionic acid and dimethylolbutyric acid. With more particular preference the compound (A4) is dimethylolpropionic acid.

The optional component A5 is a poly-$C_2$-$C_3$ alkylene ether compound having an average OH functionality in the range from 0.9 to 1.2. This refers to polyethylene glycol ethers, polypropylene glycol ethers, and polyethylene glycol-co-propylene glycol ethers which have on average 0.9 to 1.2 and more particularly 1 hydroxyl group in the molecule. Component A5 does not only result in better dispersibility and stability being achieved by the aqueous polymer composition. Component A5 also brings about more rapid drying and better film-forming on the part of the dispersion.

The poly-$C_2$-$C_3$ alkylene ether compounds generally have a number-average molecular weight in the range from 250 to 2500 g/mol.

Component A5 is preferably selected from $C_1$-$C_4$ alkylpolyethylene glycols, more particularly methylpolyethylene glycols having a number-average molecular weight in the range from 250 to 2500 g/mol.

Preferred among the polymer compositions of the invention and polyurethane (meth)acrylates are those in which the structural components A2, A3a, A3b, A4, and A5 independently of one another and especially jointly are present in the following mass ratio:

A2 in the range from 20 to 90 wt %, more particularly in the range from 30 to 80 wt %, A3a in the range from 1 to 25 wt %, more particularly in the range from 2 to 20 wt %, A3b in the range from 1 to 25 wt %, more particularly in the range from 2 to 20 wt %, A4 in the range from 1 to 30 wt %, more particularly in the range from 5 to 25 wt %, A5 in the range from 0 to 30 wt %, more particularly in the range from 5 to 25 wt %, based in each case on the total amount of components A2, A3a, A3b, A4, and A5.

The mass ratio of the isocyanate component A1 on the one hand to the total mass of components A2, A3a, A3b, A4, and A5 on the other hand is typically in the range from 40:60 to 85:15 and more particularly in the range from 50:50 to 80:20.

The aqueous polymer compositions of the invention comprise at least one compound B in dispersed form.

The compound B preferably has on average 2.8 ethylenically unsaturated double bonds in the molecule. With particular preference the compound (B) has on average 2.8 to 6, more particularly 2.8 to 4, ethylenically unsaturated double bonds in the molecule.

Preferred compounds B are selected from compounds having at least two radically polymerizable C=C double bonds, preferably in the form of acrylic or methacrylic groups and especially in the form of acrylic groups: these include, in particular, the diesters and polyesters of acrylic acid or of methacrylic acid, and especially of acrylic acid, with aliphatic and cycloaliphatic diols or polyols, as specified above, for example, in connection with the polyester component A3a, and also include the esters of more highly polyvalent alkanepolyols, such as of tri-, tetra-, penta-, and hexaols, for example. Also suitable are the esters of alkoxylated polyols with acrylic acid or methacrylic acid.

Suitable examples include the following:

the diesters of acrylic acid or methacrylic acid with $C_2$-$C_{10}$ alkanediols, e.g., with ethanediol, propanediol, butanediol, pentanediol, hexanediol, heptanediol, octanediol, nonanediol, decanediol, and the structural isomers thereof. Particularly preferred among these are the diesters of branched $C_2$-$C_{10}$ alkanediols;

the diesters and triesters of $C_3$-$C_{10}$ alkanetriols, e.g., of propanetriol (glycerol), butanetriol, pentanetriol, hexanetriol, heptanetriol, octanetriol, nonanetriol, decanetriol, and the structural isomers thereof, such as 2,2-bishydroxymethylpropanol, 2,2-bishydroxymethylbutanol (trimethylolpropane), and 2,2-bishydroxymethylpentanol. Particularly preferred among these are the diesters and especially the triesters of branched $C_3$-$C_{10}$ alkanetriols;

the diesters, triesters, and tetraesters of $C_4$-$C_{10}$ alkanetetraols and of bis(bishydroxy-$C_3$-$C_{10}$ alkyl ethers), e.g., of n-butanetetraol, n-pentanetetraol, n-hexanetetraol, n-heptanetetraol, n-octanetetraol, n-nonanetetraol, n-decanetetraol, bis(2,2-di(hydroxymethyl)butyl) ether (bis(trimethylolpropane), and also the structural isomers thereof, such as 2,2-bishydroxymethylpropane-1,3-diol (pentaerythritol). Particularly preferred among these are the triesters and especially the tetraesters of branched $C_4$-$C_{10}$ alkanetetraols and also the tetraesters of bis(bishydroxy-$C_3$-$C_{10}$ alkyl) ethers;

the tetraesters, pentaesters, and hexaesters of $C_6$-$C_{10}$ alkanehexaols and of bis(trihydroxy-$C_4$-$C_{10}$ alkyl ethers), e.g., of n-hexanehexaol, n-heptanehexaol, n-octanehexaol, bis(trihydroxybutyl) ether, bis(trihydroxypentyl) ether, and bis(trihydroxyhexyl) ether, and the structural isomers thereof, such as bis(3-hydroxy-bis-2,2-(hydroxymethyl)propyl ether (dipentaerythritol). Particularly preferred among these are the pentaesters and especially the hexaesters of branched $C_6$-$C_{10}$ alkanehexaols and the hexaesters of bis(trihydroxy-$C_4$-$C_{10}$ alkyl) ethers.

Examples of compounds B are hexanediol diacrylate, hexanediol dimethacrylate, octanediol diacrylate, octanediol dimethacrylate, nonanediol diacrylate, nonanediol dimethacrylate, decanediol diacrylate, decanediol dimethacrylate, trimethylolpropane triacrylate, trimethylolpropane trimethacrylate, trimethylolbutane triacrylate, trimethylolpentane triacrylate, trimethylolbutane trimethacrylate, trimethylolpentane trimethacrylate, bis(trimethylolpropane)tetraacrylate, bis-(trimethylolpropane)tetramethacrylate, pentaerythritol diacrylate, pentaerythritol triacrylate, pentaerythritol tetraacrylate, pentaerythritol dimethacrylate, pentaerythritol trimethacrylate, pentaerythritol tetramethacrylate, dipentaerythritol tetraacrylate, dipentaerythritol triacrylate, dipentaerythritol pentaacrylate, dipentaerythritol hexaacrylate, dipentaerythritol tetramethacrylate, dipentaerythritol trimethacrylate, dipentaerythritol pentamethacrylate, dipentaerythritol hexamethacrylate, etc. Also suitable are the esters of alkoxylated polyols with acrylic acid or methacrylic acid, examples being the polyacrylates or polymethacrylates of alkoxylated trimethylolpropane, glycerol, or pentaerythritol. Additionally suitable are the esters of alicyclic diols, such as cyclohexanediol di(meth)acrylate and bis(hydroxymethylethyl)cyclohexane di(meth)acrylate.

The compound B preferably has no functional groups which are able to react with isocyanate groups to form covalent bonds.

In preferred groups of embodiments, the compound B has a water-solubility of not more than 10 g/L. More preferably the compound B has a water-solubility of not more than 5 g/L and especially 1 g/L. The water-solubilities stated here refer to the solubility in deionized water, determined at 25° C. and 1 bar.

With particular preference the compound B is selected from diacrylates of $C_2$-$C_{10}$ alkanediols, triacrylates of $C_3$-$C_{10}$ alkanetriols, tetraacrylates of $C_4$-$C_{10}$ alkanetetraols, tetraacrylates of bis(bishydroxy-$C_3$-$C_{10}$ alkyl) ethers, hexaacrylates of bis(trihydroxy-$C_4$-$C_{10}$ alkyl) ethers, and the corresponding methacrylates.

With particular preference the compound B is selected from dipropylene glycol diacrylate, trimethylolpropane triacrylate, trimethylolpropane trimethacrylate, pentaerythritol tetraacrylate, bis(dimethylolpropane) tetraacrylate, and bis (pentaerythritol) hexaacrylate. The compound B especially is trimethylolpropane triacrylate.

In one embodiment the compound B and the polyurethane (meth)acrylate A are present in the form of droplets or particles which comprise predominantly both the compound B and the polyurethane (meth)acrylate A, especially when the compound B has a water-solubility of not more than 10 g/L.

The average particle size of the dispersed polyurethane (meth)acrylate or of the mixture of polyurethane (meth)acrylate and compound B in the composition is generally 10 to 300 nm, more particularly 20 to 200 nm. The average particle size reported is the volume average D(4.3) as determined by light scattering.

The composition of the invention comprises the compound B preferably in an amount of 5 to 50 wt %, based on the total mass of compound B and polyurethane (meth)acrylate A. More preferably the composition comprises the compound B) in an amount of 5 to 30 wt %, based on the total mass of compounds B and polyurethane (meth)acrylate A.

The composition of the invention preferably comprises a total amount of ethylenically unsaturated double bonds in the form of acrylate or methacrylate groups in the range from 1 to 6 mol per kg, based on the total mass of compound B and polyurethane (meth)acrylate A. More preferably the composition comprises a total amount of ethylenically unsaturated double bonds in the form of acrylate or methacrylate groups in the range from 1 to 4 mol per kg, based on the total mass of compound B and polyurethane (meth) acrylate A.

The composition of the invention preferably comprises less than 0.1 wt % of emulsifiers, based on the total mass of compound B and polyurethane (meth)acrylate A.

Additionally provided by the invention is a method for producing a composition of the invention. The production typically comprises preparing the polyurethane (meth)acrylate by reacting the isocyanate component A1 with components A2, A3, A4, and optionally A5 in an aprotic organic solvent in analogy to the preparation of polyurethanes. Subsequently the polyurethane will be dispersed in water and the compound B added, with the addition of the compound B being able in principle to take place before, during, or after the dispersing in water.

In this context it has proven advantageous if the method is carried out such that the solution obtained in the preparation of the polyurethane (meth)acrylate is mixed with the compound B and the solution is then dispersed in water. This procedure results in improved stability on the part of the aqueous polymer composition with respect to separation. Accordingly, the method of the invention comprises more particularly the following steps:
 i. reacting the isocyanate component A1 with the components A2, A3, A4, and optionally A5 in an aprotic organic solvent to give a solution of the polyurethane (meth)acrylate in the aprotic organic solvent;
 ii. adding the at least one compound B to the solution of polyurethane (meth)acrylate in the aprotic organic solvent;
 iii. dispersing the solution comprising the polyurethane (meth)acrylate and the compound B in water, and removing the aprotic organic solvent.

Step i. relates to the preparation of polyurethane (meth)acrylate. For this purpose, the isocyanate component A1 is reacted with the components A2, A3, A4, and optionally A5, with the reactive groups of components A2, A3, A4, and optionally A5 being consumed by reaction with the isocyanate groups of component A1. The components A2, A3, A4, and optionally A5 here are used typically in an amount corresponding approximately to the required stoichiometry and the desired mass fractions. More particularly the isocyanate component A1 and the components A2, A3, A4, and optionally A5 are used in an amount such that the molar ratio of the isocyanate groups in A1 to the total amount of the functional groups in components A2, A3, A4, and optionally A5 that react with the isocyanate groups to form covalent bonds is in the range from 1:1.1 to 1.1:1. More particularly the molar ratio of isocyanate groups in A1 to the total amount of the functional groups in components A2, A3, A4, and optionally A5 is at least 1:1 and is situated especially in the range from 1:1 to 1.05:1.

For the preparation the general procedure is to introduce initially at least part, as for example at least 75%, more particularly at least 90%, and especially the total amount of components A2, A3, A4, and optionally A5, and to add component A1 to this initial charge. Component A1 may be added under reaction conditions. Preferably, however, component A1 will be added first and then reaction conditions will be brought about under which the isocyanate groups react with the reactive functional groups of components A2, A3, A4, and optionally A5.

The reaction of component A1 with components A2, A3, A4, and optionally A5 takes place in general at temperatures in the range from 40 to 100° C., preferably in the range from 50 to 90° C. During the reaction, the temperature may remain the same or be increased continuously or in stages.

The reaction is generally carried out until the NCO value has attained a level of at least 95%, preferably at least 97%, and more preferably at least 98% of the theoretical conversion. The reaction takes place preferably until the amount of isocyanate groups in the reaction mixture does not exceed a level of 1 wt %, more particularly 0.5 wt %. Depending on the reaction temperature selected, the reaction times that are necessary to meet these conditions are customarily in the range from 3 to 20 hours, more particularly in the range from 5 to 12 hours. With preference the reaction takes place with the reaction mixture being mixed, with stirring and/or circulatory pumping, for example.

The reaction is preferably accelerated by addition of at least one suitable catalyst. Such catalysts are known from the literature, as for example from G. Oertel (editor), Polyurethane, 3rd edition 1993, Carl Hanser Verlag, Munich-Vienna, pages 104 to 110, section 3.4.1. "Catalysts".

Suitable catalysts are organic amines, more particularly tertiary aliphatic, cycloaliphatic, or aromatic amines, Brønsted acids and/or Lewis-acidic organic metal compounds, the latter being preferred. Mixtures of the aforementioned catalysts are suitable as well.

Examples of Lewis-acidic organic metal compounds are
 tin compounds, more particularly tin(II) salts of organic carboxylic acids, e.g., tin(II) diacetate, tin(II) dioctoate, tin(II) bis(ethylhexanoate), and tin(II) dilaurate, and the dialkyltin(IV) salts of organic carboxylic acids, e.g., dimethyltin diacetate, dibutyltin diacetate, dibutyltin dibutyrate, dibutyltin bis(2-ethylhexanoate), dibutyltin dilaurate, dibutyltin maleate, dioctyltin dilaurate, and dioctyltin diacetate;
 zinc salts of organic carboxylic acids, e.g., zinc(II) diacetate, zinc(II) dioctoate, zinc(II) bis(ethylhexanoate), zinc(II) neodecanoate (zinc(II) bis(7,7-dimethyloctanoate), and zinc(II) dilaurate;
 bismuth compounds, e.g., bismuth carboxylates, especially of carboxylates which have at least six carbon atoms, e.g., bismuth octoates, ethylhexanoates, neodecanoates, or pivalates; for example, K-KAT 348, XC-B221; XC-C227, XC 8203, and XK-601 from King Industries, TIB KAT 716, 716LA, 716XLA, 718, 720, 789 from TIB Chemicals, and those from Shepherd Lausanne, and also, for example, Borchi® Kat 24; 315; 320 from OMG Borchers GmbH, Langenfeld, Germany;
 acetylacetonates of iron, of titanium, of aluminum, of zirconium, of manganese, of nickel, of zinc, and of cobalt;
 zirconium, titanium, and aluminum compounds, e.g., zirconium tetraacetylacetonate (e.g., K-KAT® 4205 from King Industries); zirconium dionates (e.g., K-KAT®, XC-9213; XC-A 209 and XC-6212 from King Industries); aluminum dionate (e.g., K-KAT® 5218 5 from King Industries).

Further metal catalysts are described by Blank et al. in Progress in Organic Coatings, 1999, vol. 35, pages 19-29.

With preference no dialkyltin(IV) salts are used. Zinc catalysts are used with preference. Among the zinc catalysts, preference is given to zinc carboxylates, more preferably to those of carboxylates which have at least six carbon atoms, very preferably at least eight carbon atoms, more particularly to zinc(II) diacetate or zinc(II) dioctoate or zinc(II) neodecanoate. Examples of commercial catalysts are Borchi® Kat 22 from OMG Borchers GmbH, Langenfeld, Germany, and also TIB KAT 616, TIB KAT 620, and TIB KAT 635, in each case from TIB Chemicals AG, Mannheim, Germany.

It is possible to boost the activity of the catalysts additionally through the presence of acids, as for example through acids having a pKa of <2.5, as described in EP 2316867 A1, or having a pKa of between 2.8 and 4.5, as described in WO 04/029121 A1. The use of acids having a pKa of not more than 4.8 is preferred, of not more than 2.5 particularly preferred.

It is also conceivable to carry out the reaction without catalyst; in that case, however, the reaction mixture must be exposed to higher temperatures and/or for longer reaction times.

In order to prevent unwanted polymerization of the (meth) acrylate groups during the reaction, polymerization inhibitors can be added. Inhibitors of this kind are described in, for example, WO 03/035596, page 5, line 35 to page 10, line 4, hereby referenced in the context of the present disclosure.

One preferred embodiment of the present invention may be that of using incorporable polymerization inhibitors, these being inhibitors which comprise an —OH or —NH$_2$ group, i.e., an isocyanate-reactive group. One preferred example of such is 4-hydroxy-2,2,6,6-tetramethylpiperidine-N-oxyl.

Step i) takes place in an aprotic solvent. Preferred aprotic organic solvents are aliphatic ketones, especially those having 3 to 8 C atoms, mono-$C_1$-$C_4$ alkyl esters of aliphatic monocarboxylic acids, especially esters of acetic acid, aliphatic ethers, e.g., di-$C_1$-$C_4$ alkyl ethers and mixtures thereof, and also mixtures of hydrocarbons. Preferred solvents are aliphatic ketones, especially those with 3 to 8 C atoms such as acetone, methyl ethyl ketone, diethyl ketone, and cyclohexanone, and mixtures thereof. The amount of solvent is generally selected such that the viscosity of the reaction mixture permits mixing and at the same time the concentration of the reactants is as high as possible.

After preparation has taken place, the reaction mixture is dispersed in water. In this context it may be an advantage to add further solvent beforehand in order to facilitate the dispersing procedure. With preference the compound B is added prior to dispersing to the solution of the reaction product of components A1, A2, A3, A4, and optionally A5, and then the mixture is dispersed in water.

It may be of advantage to neutralize the mixture before the dispersal in water, by addition of a base, more particularly an alkali metal hydroxide or carbonate, preferably in the form of an aqueous solution.

A preferred procedure is to mix the composition obtained in step i), composed of polyurethane (meth)acrylate and the aprotic solvent, optionally after dilution with further solvent, with the compound B, optionally to neutralize the mixture with base, to mix the resulting mixture with water, and to remove the solvent by distillation. One possible procedure in this case is to introduce the composition composed of polyurethane (meth)acrylate, the aprotic solvent, and optionally the compound B to water, or to add water to the composition composed of polyurethane (meth)acrylate, the aprotic solvent, and optionally the compound B.

The distillative removal of the solvent takes place in a conventional way, preferably under reduced pressure. The distillation is preferably continued such that the fraction of organic solvents is not more than 2000 ppm.

During or after the distillative removal of the solvent, optionally, further water will be added in order to set the desired solids content. Usually in this case the amount of water is calculated such as to result in a solids content of 30 to 50 wt %, although this figure may also be up to 60 wt %.

The resulting dispersions are stable in storage and after 24 hours typically have a viscosity of below 1200 mPa·s, as in the range from 10 to 1000 mPa·s, for example, measured according to DIN EN ISO 2884-1:2006-09 with a rotary viscosimeter at 22° C. and with a shear rate of 250 s$^{-1}$. In this case, optionally, further water will be added in order to set the desired solids content. The dispersions obtainable in this way can be used to produce coatings which have the advantageous application properties referred to above.

Further provided by the invention is an aqueous coating composition comprising at least one polyurethane (meth) acrylate in the form of an aqueous composition of the invention, and at least one photoinitiator.

Photoinitiators may be, for example, photoinitiators known to the skilled person, examples being those specified in "Advances in Polymer Science", Volume 14, Springer Berlin 1974 or in K. K. Dietliker, Chemistry and Technology of UV and EB Formulation for Coatings, Inks and Paints, Volume 3; Photoinitiators for Free Radical and Cationic Polymerization, P. K. T. Oldring (eds), SITA Technology Ltd, London.

Suitability is possessed, for example, by mono- or bisacylphosphine oxides, as described for example in EP-A 7 508, EP-A 57 474, DE-A 196 18 720, EP-A 495 751 or EP-A 615 980, examples being 2,4,6-trimethylbenzoyldiphenylphosphine oxide (Lucirin® TPO from BASF AG), ethyl 2,4,6-trimethylbenzoylphenylphosphinate (Lucirin® TPO L from BASF AG), bis(2,4,6-trimethylbenzoyl)phenylphosphine oxide (Irgacure® 819 from BASF SE). Suitability is also possessed by benzophenones, hydroxyacetophenones and compounds having a 1-benzoyl-1-hydroxyalkane or 1-benzoyl-1-hydroxycyclealkyl structure, phenylglyoxylic acid and its derivatives, or mixtures of these photoinitiators. Examples that may be mentioned include benzophenone, acetophenone, acetonaphthoquinone, valerophenone, hexanophenone, α-phenylbutyrophenone, p-morpholinopropiophenone, dibenzosuberone, 4-morpholinobenzophenone, 4-morpholinodeoxybenzoin, p-diacetylbenzene, 4-aminobenzophenone, 4'-methoxyacetophenone, β-methylanthraquinone, tert-butylanthraquinone, anthraquinonecarboxylic esters, benzaldehyde, α-tetralone, 9-acetyl phenanthrene, 2-acetylphenanthrene, 10-thioxanthenone, 3-acetylphenanthrene, 3-acetylindole, 9-fluorenone, 1-indanone, 1,3,4-triacetylbenzene, thioxanthen-9-one, xanthen-9-one, 2,4-dimethylthioxanthone, 2,4-diethylthioxanthone, 2,4-diisopropylthioxanthone, 2,4-dichlorothioxanthone, benzoin, benzoin isobutyl ether, chloroxanthenone, benzoin tetrahydropyranyl ether, benzoin methyl ether, benzoin ethyl ether, benzoin butyl ether, benzoin isopropyl ether, 7H-benzoin methyl ether, benz[de]anthracene-7-one, 1-naphthaldehyde, 4,4'-bis(dimethylamino)benzophenone, 4-phenylbenzophenone, 4-chlorobenzo-phenone, Michler's ketone, 1-acetonaphthone, 2-acetonaphthone, 1-benzoylcyclohexan-1-ol, 2-hydroxy-2,2-di methylacetophenone, 1-[4-(2-hydroxyethoxy)-penyl]-2-hydroxy-2-methyl-1-propan-1-one (Irgacure® 2959 from BASF SE), 2,2-dimethoxy-2-phenylacetophenone, 2,2-diethoxy-2-phenylacetophenone, 1,1-dichloroacetophenone, 1-hydroxyacetophenone, acetophenone dimethyl ketal, o-methoxybenzophenone, triphenylphosphine, tri-o-tolylphosphine, benz[a]anthracene-7, 12-dione, 2,2-diethoxyacetophenone, benzil ketals, such as benzil dimethyl ketal, 2-methyl-1-[4-(methylthio)phenyl]-2-morpholinopropan-1-one, anthraquinones such as 2-methylanthraquinone, 2-ethylanthraquinone, 2-tert-butylanthraquinone, 1-chloroanthraquinone, 2-amylanthraquinone, and 2,3-butanedione.

Also suitable are nonyellowing or low-yellowing photoinitiators of the phenylglyoxalic ester type, as described in DE-A 198 26 712, DE-A 199 13 353 or WO 98/33761.

Likewise conceivable as photoinitiators are polymeric photoinitiators, such as, for example, the diester of carboxymethoxybenzophenone with polytetramethylene glycols of various molar weights, preferably 200 to 250 g/mol (CAS 515136-48-8), and also CAS 1246194-73-9, CAS 813452-37-8, CAS 71512-90-8, CAS 886463-10-1, or other polymeric benzophenone derivatives, of the kind available commercially, for example, under the trade name Omnipol® BP from Rahn AG, Switzerland.

One embodiment uses as photoinitiators silsesquioxane compounds having at least one group with initiating effect, of the kind described in WO 2010/063612 A1, particularly from page 2, line 21 to page 43, line 9 therein, hereby considered by reference to be part of the present disclosure content, preferably from page 2, line 21 to page 30, line 5, and also the compounds described in the examples of WO 2010/063612 A1.

Typical mixtures comprise, for example, 2-hydroxy-2-methyl-1-phenylpropan-2-one and 1-hydroxycyclohexyl phenyl ketone, bis(2,6-dimethoxybenzoyl)-2,4,4-trimethylpentylphosphine oxide and 2-hydroxy-2-methyl-1-phenylpropan-1-one, benzophenone and 1-hydroxycyclohexyl phenyl ketone, bis(2,6-dimethoxybenzoyl)-2,4,4-trimethylpentylphosphine oxide and 1-hydroxycyclohexyl phenyl ketone, 2,4,6-trimethylbenzoyldiphenylphosphine oxide and 2-hydroxy-2-methyl-1-phenylpropan-1-one, 2,4,6-trimethylbenzophenone and 4-methylbenzophenone or 2,4,6-trimethylbenzophenone, and 4-methylbenzophenone and 2,4,6-trimethylbenzoyldiphenylphosphine oxide.

Preference among these photoinitiators is given to 2,4,6-trimethylbenzoyldiphenylphosphine oxide, ethyl 2,4,6-trimethylbenzoylphenylphosphinate, bis(2,4,6-tri-methylbenzoyl)phenylphosphine oxide, benzophenone, 1-benzoylcyclohexan-1-ol, 2-hydroxy-2,2-dimethylacetophenone, 1-[4-(2-hydroxyethoxy)phenyl]-2-hydroxy-2-methyl-1-propan-1-one and 2,2-dimethoxy-2-phenylacetophenone.

The coating compositions comprise the photoinitiators preferably in an amount of 0.05 to 10 wt %, more preferably 0.1 to 8 wt %, more particularly 0.2 to 6 wt %, based on the total mass of the polyurethane (meth)acrylate A and compound B.

The coating compositions may comprise further, customary coatings additives, such as flow control agents, defoamers, UV absorbers, dyes, pigments, matting agents and/or fillers.

Depending on the desired color imparted, the pigments may be inorganic pigments, examples being aluminum oxide, iron pigments such as iron(III) oxide chromium(III) oxide, titanium(IV) oxide, zirconium(IV) oxide, zinc oxide, zinc sulfide, zinc phosphate, mixed metal oxide phosphates, molybdenum sulfide, cadmium sulfide, graphite, vanadates such as bismuth vanadate, chromates, such as lead(IV) chromates, molybdates such as lead(IV) molybdate, and mixtures thereof, or may be organic pigments. Examples of organic pigments are color pigments and mother-of-pearl-like pigments such as azo, disazo, naphthol, benzimidazolone, azo condensation, metal complex, isoindolinone, quinophthalone, and dioxazine pigments, polycyclic pigments such as indigo, thioindigo, quinacridones, phthalocyanines, perylenes, perinones, anthraquinones, e.g., aminoanthraquinones or hydroxyanthraquinones, anthrapyrimidines, indanethrones, flavanthrones, pyranthrones, anthanthrones, isoviolanthrones, diketopyrrolopyrroles, and also carbazoles, e.g., carbazole violet and the like. Further examples of organic pigments may be found in the following monograph: W. Herbst, K. Hunger "Industrielle Organische Pigmente" 2nd edition, 1995, VCH Verlagsgesellschaft, ISBN: 3-527-28744-2.

Suitable fillers and matting agents comprise silicates, examples being silicates obtainable by hydrolysis of silicon tetrachloride, such as Aerosil® from Degussa, siliceous earth, talc, aluminum silicates, magnesium silicates, calcium carbonates, etc. Matting agents are, in particular, untreated or treated silicas, more particularly precipitated silicas and fumed silicas, examples being the Acematt® grades 3300, 3600, OK 412, OK500, OK607, and TS100 from Evonik Industries.

Suitable stabilizers comprise typical UV absorbers such as oxanilides, triazines, and benzotriazole (the latter available as Tinuvin® products from BASF SE), and benzophenones. They can be used alone or together with suitable radical scavengers, examples being sterically hindered amines, such as 2,2,6,6-tetramethylpiperidine, 2,6-di-tert-butylpiperidine, or derivatives thereof, e.g., bis(2,2,6,6-tetramethyl-4-piperidyl) sebacate. Stabilizers are used customarily in amounts of 0.1 to 5.0 wt %, based on the "solid" components present in the formulation.

In one preferred embodiment of the invention, a coating composition comprises a pigment-containing coating composition which as well as the polyurethane (meth)acrylate and the photoinitiator comprises at least one pigment, more particularly at least one inorganic pigment. The pigment content in this case is preferably in the range from 1 to 50 wt %, based on the composition. The mass ratio of pigment to polyurethane (meth)acrylate is preferably in the range from 1:20 to 1:1 and more particularly in the range from 1:10 to 1:1.5.

The invention further provides for use of an aqueous composition of the invention or of a coating composition of the invention to coat surfaces, more particularly wood surfaces.

The aqueous compositions of the invention and the coating compositions of the invention are suitable with preference for the coating of surfaces and substrates. Particularly preferred is their use for the coating of surfaces, such as, for example, wood, paper, textile, leather, nonwoven web, plastics surfaces, glass, ceramic, mineral building materials, such as molded cement blocks and fiber cement slabs, and of metals or coated metals.

The aqueous compositions of the invention and the coating compositions of the invention are suitable more particularly for the coating of metals, plastics surfaces such as PVC or melamine, cement or concrete surfaces, such as of concrete roof blocks and fiber cement slabs, for example, and also for the coating of wood and woodbase materials.

With particular advantage, the aqueous compositions of the invention and the coating compositions of the invention can be used for the coating of wood and woodbase materials and of wood-containing substrates, such as fiberboard. The compositions of the invention are also suitable for the coating of cellulose fiber-containing substrates, such as paper, paperboard, or cardboard, for example. The wood substrates may be, for example, solid wood substrates, such as of oak, spruce, pine, beech, maple, walnut, macore, chestnut, plane, robinia, ash, birch, stonepine, and elm; solid wood materials, such as board plywood, block plywood, glued laminated lumber, or the like, layered plywood, veneered woodbase materials, such as veneered plywood, veneered layered wood, veneered strip wood, flexural plywood; or wood particle materials, such as MDF board, HDF board, or OSB board, and also cork.

The invention further provides a method for coating surfaces, comprising applying an aqueous composition of the invention or a coating composition of the invention to the wood surface to be coated, to give a wet coating, drying the wet coating, and curing the coating using high-energy radiation.

The substrates are coated in accordance with methods known to the skilled person, in which at least one aqueous composition of the invention or coating composition of the invention is applied in the desired thickness to the substrate that is to be coated, and the volatile constituents of the composition are removed. If desired, this procedure may be repeated one or more times. The substrate may be applied in a conventional way, as for example by spraying, troweling, knifecoating, brushing, rolling, roller coating or pouring. The coating thickness is generally in a range from 5 to 250 g/m$^2$, preferably from 20 to 150 g/m$^2$, and more preferably from 25 to 120 g/m$^2$, calculated as solids.

If two or more coats of the coating material are applied one over another, it is possible optionally for a radiation cure and/or interim sanding to take place after each coating procedure.

Radiation curing is accomplished by exposure to high-energy radiation, in other words UV radiation or daylight, preferably by light with a wavelength of 250 to 600 nm, or by irradiation with high-energy electrons (electron beam radiation; 150 to 300 keV). Examples of radiation sources used include high-pressure mercury vapor lamps, lasers, pulsed lamps (flashlight), halogen lamps, or excimer emitters. The radiation dose typically sufficient for crosslinking in the case of the UV curing is in the range from 80 to 1300 mJ/cm$^2$. Preference is given to low-pressure, medium-pressure or high-pressure mercury lamps, which may optionally have been doped with gallium or iron, and also, furthermore, to LED emitters.

Irradiation may also, optionally, be carried out in the absence of oxygen, as for example under an inert gas atmosphere. Suitable inert gases include, preferably, nitrogen, noble gases, carbon dioxide, or combustion gases. Irradiation may also take place with the coating material being covered by transparent media. Examples of transparent media are polymeric films, glass, or liquids, water for example. Particular preference is given to irradiation in the manner as described in DE-A1 199 57 900.

In one preferred method, curing takes place continuously, by passing the substrate treated with the coating material at constant speed past a radiation source. For this it is necessary for the cure rate of the coating material to be sufficiently high.

This varied course of curing over time can be exploited in particular when the coating of the article is followed by a processing step in which the film surface comes into direct contact with another article or is worked on mechanically.

EXAMPLES

Materials

Polyethylene glycol monoethyl ether with an OH functionality of 1, molecular weight about 1000 g/mol (Pluriol® A 1020 E, BASF).

Aliphatic polyester diol made from hexanedoic acid and neopentyl glycol, having a number-average molecular weight Mn of 535, an OH number of 200-220 mg KOH/g, and an acid number of <2 mg KOH/g (e.g., Lupraphen® 7901/1, BASF).

Isocyanurate of hexamethylene diisocyanate, having an isocyanate equivalent weight of 190 g/mol and an isocyanate functionality of 3 (Basonat® HI 100, BASF).

4,4'-Diisocyanatodicyclohexylmethane (Desmodur® W, Bayer MaterialScience).

Isocyanurate of isophorone diisocyanate, having an isocyanate equivalent weight of 243 g/mol and an isocyanate functionality of 3.5 (Vestanat® T 1890, Evonik Industries).

1,1,1-Trimethylolpropane triacrylate (60%, Laromer® TMPTA, BASF).

Dipropylene glycol diacrylate (99%, Laromer® DPGDA, BASF).

Ethoxylated pentaeryrthritol tetraacrylate (Laromer® PPTTA, BASF).

Analysis

The dynamic viscosity of the dispersion was measured in accordance with DIN EN ISO 2884-1:2006-09 using a "Physica Rheolab MC1" rotary viscosimeter from Anton Paar at 23° C. and with a shear rate of 250 s$^{-1}$.

The particle size of the dispersions was determined by dynamic light scattering using a "Delsa Nano S" from Beckman Coulter at 25° C.

Examples 1a-1c 19.63 g of dimethylolpropionoic acid, 90.87 g of 2-hydroxyethyl acrylate, 20.25 g of polyethylene glycol monoethyl ether, 9.96 g of 1,4-cyclohexanedimethanol, 14.47 g of aliphatic polyester diol, 29.74 g of trimer of hexamethylene diisocyanate, 43.69 g of 4,4'-diisocyanatodicyclohexylmethane, 201.18 g of trimer of isophorone diisocyanate, 0.21 g of 3,5-di-tert-butyl-4-hydroxytoluene, and 0.09 g of 4-oxypiperidol (4-hydroxy-TEMPO) were charged to a stirred vessel and diluted by addition of 108 g of methyl ethyl ketone. Following addition of 0.30 g of zinc neodecanoate, the mixture was heated to 80° C.

The course of reaction was monitored by measurement of the NCO content. At an NCO content of <0.40 wt %, the mixture was diluted further by addition of 161.4 g of acetone. Then a component B was added.

Example 1a: 1,1,1-trimethylolpropane triacrylate
Example 1b: dipropylene glycol diacrylate
Example 1c: ethoxylated pentaeryrthritol tetraacrylate The amount of component B was selected such that the completed dispersions had equal double bond densities (2.6 mmol/g).

The mixtures obtained were neutralized by addition of 41.02 g of aqueous NaOH solution (10 wt %) and dispersed in 500 g of deionized water. The solvent was then removed by distillation and a further 200 g of deionized water were added. The polymer was obtained as a dispersion in water.

Example 1a: solids content: 41.3 wt %, dynamic viscosity: 105 mPa·s, average particle size D(4.3): 63 nm.

Example 1b: solids content: 40.9 wt %, dynamic viscosity: 95 mPa·s, average particle size D(4.3): 53 nm.

Example 1c: solids content: 41.5 wt %, dynamic viscosity: 85 mPa·s, average particle size D(4.3): 60 nm.

Example 2

4.74 g of dimethylolpropionoic acid, 253.35 g of 2-hydroxyethyl acrylate, 56.47 g of polyethylene glycol monoethyl ether, 27.74 g of 1,4-cyclohexanedimethanol, 40.35 g of aliphatic polyester diol, 82.91 g of trimer of hexamethylene diisocyanate, 121.82 g of 4,4'-diisocyanatodicyclohexylmethane, 560.91 g of trimer of isophorone diisocyanate, 0.60 g of 3,5-di-tert-butyl-4-hydroxytoluene, and 0.24 g of 4-oxypiperidol (4-hydroxy-TEMPO) were charged to a stirred vessel and diluted by addition of 300 g of methyl ethyl ketone. Following addition of 0.84 g of zinc neodecanoate, the mixture was heated to 80° C.

The course of reaction was monitored by measurement of the NCO content. At an NCO content of <0.40 wt %, the mixture was diluted further by addition of 450 g of acetone. The mixtures obtained were neutralized by addition of 114.38 g of aqueous NaOH solution (10 wt %) and dispersed in 1300 g of deionized water. The solvent was then removed by distillation and a further 500 g of deionized water were added. The polymer was obtained as an aqueous dispersion. Solids content: 40.9 wt %, dynamic viscosity: 36 mPa·s, average particle size D(4.3): 60 nm.

Examples 2a-2c

Portions of 400 g of the dispersion from example 2 were admixed in each case with the following component B, with stirring:

Example 2a: 17.60 g of 1,1,1-trimethylolpropane triacrylate, 26.40 g of deionized water. Solids content: 40.5 wt %, dynamic viscosity: 210 mPa·s, average particle size D(4.3) 61 nm.

Example 2b: 22.40 g of dipropylene glycol diacrylate, 33.60 g of deionized water. Solids content: 40.5 wt %, dynamic viscosity: 208 mPa·s, average particle size D(4.3) 60 nm.

Example 2c: 28.80 g of ethoxylated pentaerythritol tetraacrylate, 43.20 g of deionized water. Solids content: 40.6 wt %, dynamic viscosity: 155 mPa·s, average particle size D(4.3) 61 nm.

Example 3

38.22 g of dimethylolpropionoic acid, 176.91 g of 2-hydroxyethyl acrylate, 39.43 g of polyethylene glycol monoethyl ether, 19.39 g of 1,4-cyclohexanedimethanol, 28.18 g of aliphatic polyester diol, 194.11 g of trimer of hexamethylene diisocyanate, 85.06 g of 4,4'-diisocyanatodicyclohexylmethane, 217.59 g of trimer of isophorone diisocyanate, 0.40 g of 3,5-di-tert-butyl-4-hydroxytoluene, and 0.16 g of 4-oxypiperidol (4-hydroxy-TEMPO) were charged to a stirred vessel and diluted by addition of 200 g of methyl ethyl ketone. Following addition of 0.56 g of zinc neodecanoate, the mixture was heated to 80° C.

The course of reaction was monitored by measurement of the NCO content. At an NCO content of <0.40 wt %, the mixture was diluted further by addition of 300 g of acetone. Then 160.00 g of 1,1,1-trimethylolpropane triacrylate were added.

The mixtures obtained were neutralized by addition of 79.86 g of aqueous NaOH solution (10 wt %) and dispersed in 1000 g of deionized water. The solvent was then removed by distillation and a further 500 g of deionized water were added. The aqueous dispersion obtained had a solids content of 41.1 wt % and a dynamic viscosity of 146 mPa·s. The average particle size (D4.3) was 43 nm.

Example 4

36.22 g of dimethylolpropionoic acid, 166.25 g of 2-hydroxyethyl acrylate, 49.25 g of polyethylene glycol monoethyl ether, 18.37 g of 1,4-cyclohexanedimethanol, 26.70 g of aliphatic polyester diol, 70.99 g of trimer of hexamethylene diisocyanate, 80.60 g of 4,4'-diisocyanatodicyclohexylmethane, 350.50 g of trimer of isophorone diisocyanate, 0.40 g of 3,5-di-tert-butyl-4-hydroxytoluene, and 0.16 g of 4-oxypiperidol (4-hydroxy-TEMPO) were charged to a stirred vessel and diluted by addition of 200 g of methyl ethyl ketone. Following addition of 0.56 g of zinc neodecanoate, the mixture was heated to 80° C.

The course of reaction was monitored by measurement of the NCO content. At an NCO content of <0.40 wt %, the mixture was diluted further by addition of 300 g of acetone. Then 160.00 g of 1,1,1-trimethylolpropane triacrylate were added.

The mixtures obtained were neutralized by addition of 72.44 g of aqueous NaOH solution (10 wt %) and dispersed in 1000 g of deionized water. The solvent was then removed by distillation and a further 380 g of deionized water were added.

The aqueous dispersion obtained had a solids content of 39.2 wt % and a dynamic viscosity of 317 mPa·s. The average particle size (D4.3) was 55 nm.

Example 5

35.14 g of dimethylolpropionoic acid, 153.86 g of 2-hydroxyethyl acrylate, 48.00 g of polyethylene glycol monoethyl ether, 16.67 g of 1,4-cyclohexanedimethanol, 4.32 g of aliphatic polyester diol, 84.13 g of pentaerythritol tri/tetraacrylate, 178.63 g of trimer of hexamethylene diisocyanate, 77.89 g of 4,4'-diisocyanatodicyclohexylmethane, 200.24 g of trimer of isophorone diisocyanate, 0.40 g of 3,5-di-tert-butyl-4-hydroxytoluene, and 0.16 g of 4-oxypiperidol (4-hydroxy-TEMPO) were charged to a stirred vessel and diluted by addition of 200 g of methyl ethyl ketone. Following addition of 0.56 g of zinc neodecanoate, the mixture was heated to 80° C.

The course of reaction was monitored by measurement of the NCO content. At an NCO content of <0.40 wt %, the mixture was diluted further by addition of 300 g of acetone.

The mixtures obtained were neutralized by addition of 79.03 g of aqueous NaOH solution (10 wt %) and dispersed in 1000 g of deionized water. The solvent was then removed by distillation and a further 223 g of deionized water were added. The aqueous dispersion obtained had a solids content of 39.7 wt % and a dynamic viscosity of 345 mPa·s. The average particle size (D4.3) was 37 nm.

Example 6

29.72 g of dimethylolpropionoic acid, 137.57 g of 2-hydroxyethyl acrylate, 30.66 g of polyethylene glycol monoethyl ether, 15.07 g of 1,4-cyclohexanedimethanol, 21.91 g of aliphatic polyester diol, 230.39 g of trimer of hexamethylene diisocyanate, 66.15 g of 4,4'-diisocyanatodicyclohexylmethane, 67.68 g of trimer of isophorone diisocyanate, 0.30 g of 3,5-di-tert-butyl-4-hydroxytoluene, and 0.12 g of 4-oxypiperidol (4-hydroxy-TEMPO) were charged to a stirred vessel and diluted by addition of 150 g of methyl ethyl ketone. Following addition of 0.42 g of zinc neodecanoate, the mixture was heated to 80° C.

The course of reaction was monitored by measurement of the NCO content. At an NCO content of <0.40 wt %, the mixture was diluted further by addition of 225 g of acetone.

Afterwards, 120 g 1,1,1-trimethylolpropane triacrylate were added. The mixture obtained was neutralized by addition of 62.1 g of aqueous NaOH solution (10 wt %) and dispersed in 1012.5 g of deionized water. The solvent was then removed by distillation. The aqueous dispersion obtained had a solids content of 40.7 wt % and a dynamic viscosity of 460 mPa·s.

Example 7

28.67 g of dimethylolpropionoic acid, 132.68 g of 2-hydroxyethyl acrylate, 29.57 g of polyethylene glycol monoethyl ether, 14.54 g of 1,4-cyclohexanedimethanol, 21.13 g of aliphatic polyester diol, 145.58 g of trimer of hexamethylene diisocyanate, 63.80 g of 4,4'-diisocyanatodicyclohexylmethane, 163.19 g of trimer of isophorone diisocyanate, 0.30 g of 3,5-di-tert-butyl-4-hydroxytoluene, and 0.12 g of 4-oxypiperidol (4-hydroxy-TEMPO) were charged to a stirred vessel and diluted by addition of 150 g of methyl ethyl ketone. Following addition of 0.42 g of zinc neodecanoate, the mixture was heated to 80° C.

The course of reaction was monitored by measurement of the NCO content. At an NCO content of <0.40 wt %, the mixture was diluted further by addition of 225 g of acetone.

Afterwards, 120 g 1,1,1-trimethylolpropane triacrylate were added. The mixture obtained was neutralized by addition of 59.9 g of aqueous NaOH solution (10 wt %) and dispersed in 1012.5 g of deionized water. The solvent was then removed by distillation. The aqueous dispersion obtained had a solids content of 38.9 wt % and a dynamic viscosity of 155 mPa·s.

Example 8

28.00 g of dimethylolpropionoic acid, 129.61 g of 2-hydroxyethyl acrylate, 28.89 g of polyethylene glycol monoethyl ether, 14.20 g of 1,4-cyclohexanedimethanol, 20.64 g of aliphatic polyester diol, 92.31 g of trimer of hexamethylene diisocyanate, 62.32 g of 4,4'-diisocyanatodicyclohexylmethane, 223.18 g of trimer of isophorone diisocyanate, 0.30 g of 3,5-di-tert-butyl-4-hydroxytoluene, and 0.12 g of 4-oxypiperidol (4-hydroxy-TEMPO) were charged to a stirred vessel and diluted by addition of 150 g of methyl ethyl ketone. Following addition of 0.42 g of zinc neodecanoate, the mixture was heated to 80° C.

The course of reaction was monitored by measurement of the NCO content. At an NCO content of <0.40 wt %, the mixture was diluted further by addition of 225 g of acetone.

Afterwards, 120 g 1,1,1-trimethylolpropane triacrylate were added. The mixture obtained was neutralized by addition of 62.1 g of aqueous NaOH solution (10 wt %) and dispersed in 1012.5 g of deionized water. The solvent was then removed by distillation. The aqueous dispersion obtained had a solids content of 39.9 wt % and a dynamic viscosity of 200 mPa·s.

Performance Testing

For the performance testing, the dispersions were adjusted to a solids content of 40 wt % and formulated in each case as transparent varnish and white paint:

Transparent Varnish Formulation:
100 g of dispersion
14.3 g of water
1.6 g of photoinitiator mixture of 1-hydroxycyclohexyl phenyl ketone and benzophenone The constituents were mixed for 15 minutes in a laboratory dissolver.

White Paint Formulation:
100 g of dispersion
34 g of water
21 g of white pigment composition (aqueous, 60%)
1.2 g of photoinitiator mixture of 1-hydroxycyclohexyl phenyl ketone and benzophenone 1.0 g of 1-hydroxycyclohexyl phenyl ketone
0.2 g of fluorine-containing polyacrylate (Hydropalat 3500 or 3370)

For the determination of the pendulum hardness, the coating compositions were applied to a glass plate in a coating thickness of 200 µm, using a four-way bar applicator. The coating was subsequently flashed first at 22° C. for 10 minutes and then at 60° C. for 20 minutes in a forced-air oven. For the curing/exposure described in the paragraph below, half of the plate is covered with a board. After the curing, the two halves are pendulum-tested separately (with/without UV curing). The pendulum hardness was measured in accordance with DIN EN ISO 1522.

The appearance of the film (film on glass) is assessed visually, on the glass plate coated with the transparent varnish formula (200 µm wet/four-way bar applicator) for the determination of the pendulum hardness, on the dried and UV-cured film surface.

The appearance of the dispersion is assessed optically on a sample of dispersion in a colorless, clear glass vessel, in respect of color, sedimentation of the dispersion, and separation. The sample is rated + if there is no significant deficiency in evidence.

UV curing took place by irradiation in an IST UV unit on a conveyor belt at 5 m/min. In the case of the transparent varnishes, irradiation was carried out with 1 UV lamp (200 W/cm, medium-pressure mercury lamp, power 50%, dose 1500-1750 mJ/cm$^2$). In the case of the white paints, irradiation took place with 2 UV lamps (200 W/cm, medium-pressure mercury lamp, power 50%, dose 1500-1750 mJ/cm$^2$, and 200 W/cm gallium lamp, power 50%, dose 1050-1300 mJ/cm$^2$).

For the determination of the chemical resistance, the coating compositions were applied to pre-sanded beech wood in a coating thickness of 200 µm, using a four-way bar applicator. This was followed by flashing first at 22° C. for 10 minutes and then at 60° C. for 20 minutes in a forced-air oven, and by UV curing in the manner described above. The specimens were then sanded, and the coating material was applied again in a thickness of 200 µm, followed by as-described drying and UV curing.

The chemical resistance (coffee, water, alcohol) was determined in accordance with DIN EN 12720/DIN 68861-1, on the basis of a rating scale from 1 to 5: 5=high resistance, 1=poor resistance.

For the determination of the physical drying of the film before UV curing, the respective coating formulation was applied to a glass plate and flashed with a forced-air oven in the manner described for the pendulum hardness. A cotton pad was then dabbed gently onto the film, and the physical drying was determined qualitatively from the amount of cotton filaments adhering to the film, on the basis of a rating scale from 1 to 5:

1=highly tacky, numerous adhering cotton fibers
2=tacky
3=slightly tacky
4=minimal tack
5=tack-free The results of the performance tests are compiled in tables 1, 2, and 3 below.

TABLE 1 transparent varnishes

| | Dispersion from example | | | | | | | |
|---|---|---|---|---|---|---|---|---|
| | 2 | 1a | 1b | 1c | 2a | 2b | 2c | 4 |
| Double bond density | | 2.6 | 2.6 | 2.6 | 2.6 | 2.6 | 2.6 | 3.2 |
| Stability of dispersion | + | + | + | + | + | + | + | + |
| Pendulum hardness without UV curing[1)] | 84 | 68 | 42 | 34 | 58 | 52 | 50 | 15 |
| Pendulum hardness after/with UV curing[1)] | 69 | 148 | 148 | 139 | 149 | 167 | 148 | 150 |
| Film on glass after UV curing | numerous cracks | cracks at the edge | ok, streaking | cracks at the edge; streaking | cracks at the edge; severe orange peel effect | disruptive surface; slight orange peel effect | cracks at the edge; slight orange peel effect | + |
| Tackiness/physical drying | 5 | 5 | 4 | 3 | 4 | 4 | 3 | 1 |
| Chemical resistance | | | | | | | | |
| Coffee [6 h] | n.d.[2)] | 5 | 5 | 5 | 5 | 5 | 5 | 5 |
| Coffee [16 h] | n.d.[2)] | 5 | 5 | 5 | 5 | 5 | 5 | 5 |
| Water [24 h] | n.d.[2)] | 5 | 5 | 5 | 5 | 5 | 5 | 5 |

[1)]in number of swings,
[2)]not determinable, owing to absence of film formation

TABLE 2 white paints

| | Dispersion from example | | | | | | | |
|---|---|---|---|---|---|---|---|---|
| | 2 | 1a | 1b | 1c | 2a | 2b | 2c | 4 |
| Double bond density | | 2.6 | 2.6 | 2.6 | 2.6 | 2.6 | 2.6 | 3.2 |
| Stability of dispersion | + | + | + | + | + | + | + | + |
| Pendulum hardness without UV curing[1)] | 65 | 40 | 44 | 18 | 41 | 40 | 28 | 11 |
| Pendulum hardness after/with UV curing[1)] | 76 | 132 | 135 | 129 | 135 | 133 | 137 | 138 |
| Film on glass | numerous defects | + | + | + | + | + | + | + |
| Tackiness/physical drying | 5 | 4 | 4 | 2 | 3 | 3 | 2 | 1 |
| Chemical resistance | | | | | | | | |
| Coffee [6 h] | n.d.[2)] | 5 | 5 | 3 | 5 | 5 | 3 | 5 |
| Coffee [16 h] | n.d.[2)] | 5 | 4 | 3 | 3 | 3 | 3 | 5 |
| Water [24 h] | n.d.[2)] | 5 | 5 | 5 | 5 | 5 | 5 | 5 |

[1)]in number of swings,
[2)]not determinable, owing to absence of film formation

TABLE 3

| | transparent varnishes | | | white paints | | |
|---|---|---|---|---|---|---|
| | Dispersion from example | | | | | |
| | 6 | 7 | 8 | 6 | 7 | 8 |
| Double bond density | 3.3 | 3.3 | 3.2 | 3.3 | 3.3 | 3.2 |
| Stability of dispersion | + | + | + | + | + | + |
| Pendulum hardness without UV curing[1)] | 0 | 2 | 8 | 2 | 2 | 7 |
| Pendulum hardness after/with UV curing[1)] | 132 | 136 | 138 | 108 | 116 | 123 |
| Film on glass | defects | defects | slight craters | + | + | + |

TABLE 3-continued

| | transparent varnishes | | | white paints | | |
|---|---|---|---|---|---|---|
| | Dispersion from example | | | | | |
| | 6 | 7 | 8 | 6 | 7 | 8 |
| Chemical resistance | | | | | | |
| Coffee [6 h] | 5 | 5 | 5 | 3 | 3 | 4 |
| Coffee [16 h] | 5 | 5 | 5 | 4 | 3 | 4 |
| Water [24 h] | 5 | 5 | 5 | 5 | 5 | 5 |

1) in number of swings

The invention claimed is:

1. An aqueous polymer composition comprising in dispersed form
A at least one polyurethane (meth)acrylate constructed from the following structural components:
A1 an isocyanate A1 component comprising:
A1a at least one polyisocyanate obtained by oligomerization of at least one diisocyanate and having an average isocyanate functionality of at least 2.5, the diisocyanate having at least one saturated alicyclic structural unit; and
A1b at least one diisocyanate selected from saturated aliphatic and saturated alicyclic diisocyanates;
A2 as component A2, at least one compound which has at least one ethylenically unsaturated double bond in a form of an acrylic or methacrylic group, and also has at least one functional group F which reacts with an isocyanate group to form a covalent bond;
A3 at least one neutral polyol component A3 comprising
A3a at least one aliphatic, polymeric polyol having an average OH functionality in the range from 1.5 to 2.5;
A3b at least one low molecular weight diol compound having a molecular weight of not more than 400 g/mol and selected from saturated aliphatic and saturated alicyclic diols; and
A4 as component A4, at least one compound which has at least one ionic or ionizable group I' and at least one functional group F' which reacts with an isocyanate group to form a covalent bond; and
B at least one compound B having a molecular weight below 1000 g/mol and having at least two ethylenically unsaturated double bonds per molecule, the ethylenically unsaturated double bond being present in a form of acrylic or methacrylic groups,
wherein the compound B has a water-solubility of not more than 5 g/L, determined in deionized water at 25° C. and 1 bar.

2. The composition according to claim 1, the polyisocyanate A1a being selected from isocyanurates of a diisocyanate which has at least one saturated alicyclic structural unit, and the diisocyanate A1b being selected from saturated alicyclic diisocyanates.

3. The composition according to claim 1, the polyisocyanate A1a making up 40 to 95 wt %, based on a total weight of the isocyanate component A1.

4. The composition according to claim 1, a total amount of polyisocyanate A1a and diisocyanate A1b making up at least 50 wt %, based on a total weight of the isocyanate component A1.

5. The composition according to claim 1, the isocyanate component A1 further comprising at least one polyisocyanate A1c having an average isocyanate functionality of at least 2.5 and obtained by oligomerization of a $C_2$-$C_8$ alkylene diisocyanate.

6. The composition according to claim 1, component A2 being selected from hydroxy-$C_2$-$C_8$ alkyl esters of acrylic acid, hydroxy-$C_2$-$C_8$ alkyl esters of methacrylic acid, hydroxy-$C_2$-$C_8$ alkylamides of acrylic acid, hydroxy-$C_2$-$C_8$ alkylamides of methacrylic acid, diesters of $C_3$-$C_8$ alkanetriols with acrylic acid, and diesters of $C_3$-$C_8$ alkanetriols with methacrylic acid.

7. The composition according to claim 1, component A3a being selected from aliphatic polyesters.

8. The composition according to claim 1, component A3b comprising at least one diol with at least one saturated alicyclic structure.

9. The composition according to claim 1, the ionic or ionizable group I' being an acid group in the acid or salt form, and component A4 being selected from aliphatic dihydroxycarboxylic acids and salts thereof.

10. The composition according to claim 1, further comprising component A5 that has at least one poly $C_2$-$C_3$ alkylene ether compound having an average OH functionality in the range from 0.9 to 1.2.

11. The composition according to claim 1, the compound B having at least one of the following features:
the compound B has on average at least 2.8 ethylenically unsaturated double bonds in the molecule; and
compound B has no functional groups which are able to react with isocyanate groups to form covalent bonds.

12. The composition according to claim 1, the compound B having a water-solubility of not more than 1 g/L, determined at 25° C. and 1 bar.

13. The composition according to claim 1, the compound B being selected from diacrylates of $C_2$-$C_{10}$ alkanediols, triacrylates of $C_3$-$C_{10}$ alkanetriols, and tetraacrylates of $C_4$-$C_{10}$ alkanetetraols.

14. The composition according to claim 1, the compound B and the polyurethane (meth)acrylate being present in a form of droplets or particles which predominantly comprise both the compound B and the polyurethane (meth)acrylate.

15. The composition according to claim 1, comprising the compound B in an amount from 5 to 50 wt %, based on a total mass of compound B and polyurethane (meth)acrylate.

16. The composition according to claim 1, having a total amount of ethylenically unsaturated double bonds in a form of acrylate or methacrylate groups in the range from 1 to 6 mol per kg, based on a total mass of compound B and polyurethane (meth)acrylate.

17. The composition according to claim 1, comprising less than 0.1 wt % of emulsifiers, based on a total mass of compound B and polyurethane (meth)acrylate.

18. A polyurethane (meth)acrylate constructed from the structural components A1, A2, A3, and A4 as defined in claim 1.

19. A method for producing a composition according to claim 1, comprising
a) reacting the isocyanate component A1 with components A2, A3, and A4 in an aprotic organic solvent to give a solution of the polyurethane (meth)acrylate in the aprotic organic solvent;
b) emulsifying the solution comprising the polyurethane (meth)acrylate in water and removing the aprotic organic solvent to give an aqueous dispersion of the polyurethane (meth)acrylate;
c) adding the compound B to the aqueous dispersion of the polyurethane (meth)acrylate;
or a' reacting the isocyanate component A1 with components A2, A3, and A4 in an aprotic organic solvent to give a solution of the polyurethane (meth)acrylate in the aprotic organic solvent;

b' adding at least one compound B to the solution of the polyurethane (meth)acrylate in the aprotic organic solvent;

c' emulsifying the solution comprising the polyurethane (meth)acrylate and the compound B in water and removing the aprotic organic solvent.

20. An aqueous coating composition comprising at least one aqueous composition according to claim 1 and at least one photoinitiator.

21. A method of coating a surface, comprising: applying an aqueous composition according to claim 1 to a surface.

22. The composition according to claim 1, wherein:
(i) the polyisocyanate A1a is selected from isocyanurates of a diisocyanate which has at least one saturated alicyclic structural unit, and the diisocyanate A1b being selected from saturated alicyclic diisocyanates;
(ii) the polyisocyanate A1a makes up 40 to 95 wt %, based on a total weight of the isocyanate component A1; and
(iii) the isocyanate component A1 further comprises at least one polyisocyanate A1c having an average isocyanate functionality of at least 2.5 and obtained by oligomerization of a $C_2$-$C_8$ alkylene diisocyanate.

23. The composition according to claim 1, wherein:
(i) the polyisocyanate A1a is selected from isocyanurates of a diisocyanate which has at least one saturated alicyclic structural unit, and the diisocyanate A1b being selected from saturated alicyclic diisocyanates;
(ii) the polyisocyanate A1a makes up 40 to 95 wt %, based on a total weight of the isocyanate component A1;
(iii) a total amount of polyisocyanate A1a and diisocyanate A1b makes up at least 50 wt %, based on a total weight of the isocyanate component A1; and
(iv) the isocyanate component A1 further comprises at least one polyisocyanate A1c having an average isocyanate functionality of at least 2.5 and obtained by oligomerization of a $C_2$-$C_8$ alkylene diisocyanate.

24. The composition according to claim 22, wherein the polyisocyanate A1a is isophorone diisocyanate and wherein the diisocyanate A1b is selected from hexamethylene diisocyanate, 1,3-bis(isocyanatomethyl)cyclohexane, isophorone diisocyanate, 4,4'-di(isocyanatocyclohexyl)methane, 2,4'di(isocyanatocyclohexyl)methane, and mixtures thereof.

25. The composition according to claim 23, wherein the polyisocyanate A1a is isophorone diisocyanate and wherein the diisocyanate A1b is selected from hexamethylene diisocyanate, 1,3-bis(isocyanatomethyl)cyclohexane, isophorone diisocyanate, 4,4'-di(isocyanatocyclohexyl)methane, 2,4'di(isocyanatocyclohexyl)methane, and mixtures thereof.

* * * * *